United States Patent
Nakagawa

[11] 3,976,365
[45] Aug. 24, 1976

[54] LARGE-APERTURE, ULTRA WIDE ANGLE PHOTOGRAPHIC LENS SYSTEM

[75] Inventor: Jihei Nakagawa, Higashi-murayama, Japan

[73] Assignee: Olympus Optical Co., Ltd., Tokyo, Japan

[22] Filed: Feb. 21, 1975

[21] Appl. No.: 551,854

[30] Foreign Application Priority Data
Feb. 23, 1974 Japan............................ 49-21632

[52] U.S. Cl................................. 350/214; 350/176
[51] Int. Cl.² ........................................ G02B 9/64
[58] Field of Search........................... 350/176, 214

[56] References Cited
UNITED STATES PATENTS
3,512,874  5/1970  Wöltche................ 350/214
3,870,400  3/1975  Yamashita et al............. 350/214

*Primary Examiner*—Paul A. Sacher
*Attorney, Agent, or Firm*—Cushman, Darby & Cushman

[57] ABSTRACT

A large-aperture, ultra wide angle photographic lens being short in the length of the entire lens system and being small in the front lens diameter wherein aberrations are favourably corrected by a thick lens and another thick cemented doublet lens which are arranged before a stop and a cemented doublet lens having a cemented surface with high diverging power which is arranged after said stop.

5 Claims, 14 Drawing Figures

SPHERICAL ABERRATION —
SINE CONDITION ----

F2

-0.02  0.02

ASTIGMATISM

45°40'

M
S 0.02  0.02

DISTORTION

45°40'

-5  5
(%)

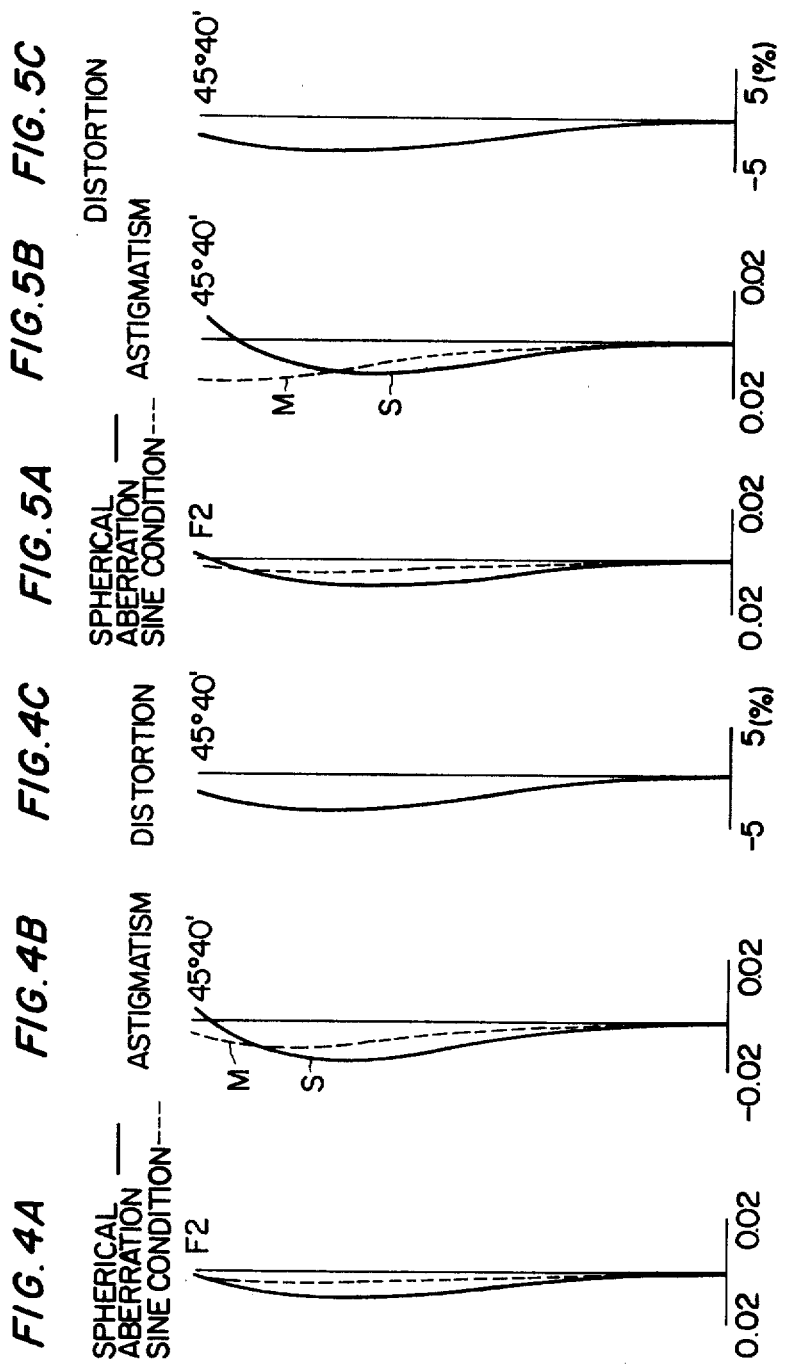

3,976,365

LARGE-APERTURE, ULTRA WIDE ANGLE PHOTOGRAPHIC LENS SYSTEM

BACKGROUND OF THE INVENTION a. Field of the Invention

The present invention relates to a retrofocus type large-aperture, ultra wide angle photographic lens having a relative aperture ratio of 1:2 and field angle of 92°.

b. Description of the Prior Art

U.S. Pat. No. 3,512,874 and Japanese Patent Publication No. 46-13477 have heretofore disclosed retrofocus type photographic lenses which are similar to that according to the present invention hereinafter described. However, such conventional photographic lenses were not sufficiently compact in their designs and had very small aperture ratios.

SUMMARY OF THE INVENTION

A primary object of the present invention is to provide a compact photographic lens system which has a large aperture ratio and ultra wide angle but is short in the length of the entire lens system and small in its front lens diameter.

Another object of the present invention is to provide a large aperture photographic lens having an ultra wide angle wherein a thick lens and a thick cemented lens component are arranged before a stop and a negative cemented lens component having high diverging power is arranged after said stop.

The photographic lens system according to the present invention comprises a first positive meniscus lens, a second negative meniscus lens, a third negative meniscus lens, a fourth positive lens, a fifth positive cemented doublet lens, a sixth negative cemented doublet lens, a seventh positive lens and an eighth positive lens. The lens system according to the present invention satisfies the following condition:

$$3.4f < f_4 < 6.5f \quad (1)$$

$$1.2f < f_5 < 1.45f \quad (2)$$

$$0.35f < d_7 < 0.6f \quad (3)$$

$$0.4f < d_9 + d_{10} < 0.55f \quad (4)$$

$$0.05 < (n_7 - n_8)/r_{13} < 0.06 \quad (5)$$

wherein the reference symbols represent as follows:
$f$: focal length of entire lens system
$f_4$: focal length of fourth lens component
$f_5$: focal length of fifth lens component
$d_7$: thickness of fourth lens componet
$d_9 + d_{10}$: thickness of fifth lens component
$n_7$: refractive index of front lens element of sixth component
$n_8$: refractive index of rear lens element of sixth component
$r_{13}$: radius of curvature of the cemented surface of sixth component Now, the significance of each condition will be described below:

Conditions (1) and (2), which are defined with regard to the fourth lens and the fifth doublet lens, are indispensable for obtaining a back focal length longer than $1.7f$ and designing a compact photographic lens system. In the lens system according to the present invention, refractive powers of the fourth and fifth lens component are made smaller than those in the conventional lens systems of the similar types. Further, the first through the third lenses are so designed, as a whole, as to have a highly negative refractive power in order to obtain a back focal length longer than $1.7f$. If the focal lengths $f_4$ and $f_5$ of the fourth and fifth lens components are selected below the lower limits of conditions (1) and (2), it will be very difficult to favourably correct various aberrations. However, it is undesirable to select the focal lengths $f_4$ and $f_5$ longer than the upper limits of conditions (1) and (2), since such long focal lengths will make it impossible to design a compact lens system as a whole. Condition (1) is especially effective to favourably correct distortion, spherical aberration and coma.

Conditions (3) and (4) are required both for designing a compact lens system in retrofocus type lenses having wide angles and favourably correcting aberrations. These conditions are essential for designing a compact lens system especially by enhancing the diverging action of the first through the third lenses as a whole as in the case of the present invention. In order to favourably correct spherical aberration and coma produced in large-aperture lenses, it is required to select a large value of $d_7$ within the range of $0.35f < d_7 < 0.6f$ defined as condition (3). If $d_7$ has a value below the lower limit of condition (3), the above-mentioned aberrations can not be corrected sufficiently. In contrast, the value of $d_7$ exceeding the upper limit of condition (3) will be unfavorable for designing a compact lens system and aggravate astigmatism.

Finally, condition (5) is necessary for correcting lateral chromatic aberration, distortion and coma. If the value of $(n_7 - n_8)/r_{13}$ exceeds the upper limit of condition (5) to result in enhancement in the diverging action on the cemented surface of the sixth component, the lateral chromatic aberration at the marginal portion will be aggravated and curvature of field at the marginal portion will be over-corrected. When, in contrast, the value of $(n_7 - n_8)/r_{13}$ is below the lower limit of the condition (5), it will be impossible to obtain sufficient corrective effect for various aberrations.

BRIEF DESCRIPTION OF THE DRAWINGS

FIG. 4A through FIG. 4C are graphs illustrating the aberration characteristic of the embodiment 2;

FIG. 5A through FIG. 5C show curves clarifying the aberration characteristic of the embodiment 3.

DETAILED DESCRIPTION OF THE PREFERRED EMBODIMENTS

Figure 1:
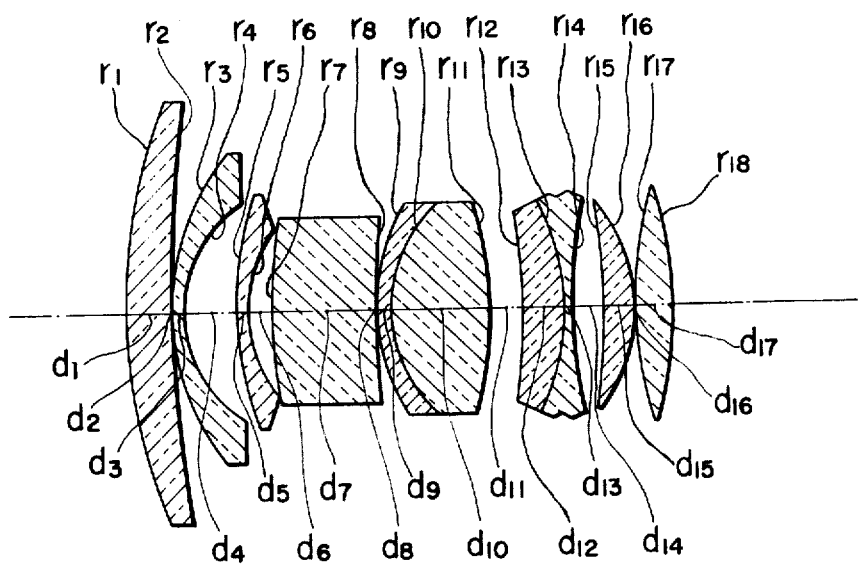
FIG. 1 shows a sectional view illustrating the composition of the embodiment, of a large-aperture, ultra wide angle photographic lens system according to the present invention.
Figure 2:
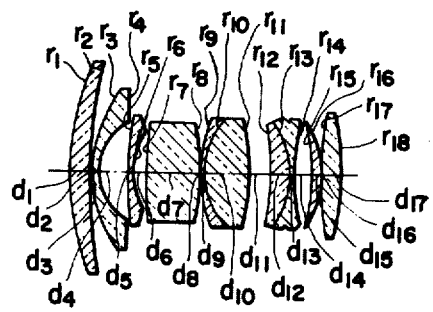
FIG. 2 shows a sectional view illustrating the composition of embodiments 2 through 4 of a lens system according to the present invention.
Figure 3A:
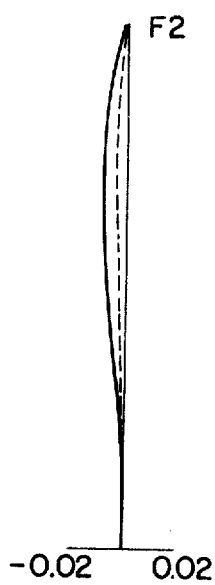
FIG. 3A through FIG. 3C are curves showing the aberration characteristic of the embodiment 1.
Figure 3B:
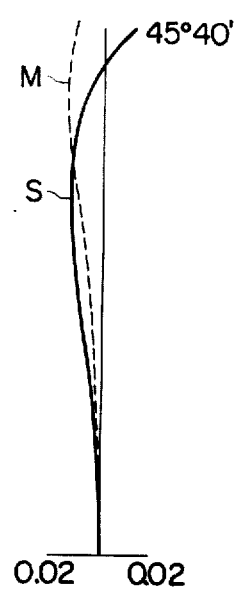
Figure 3C:
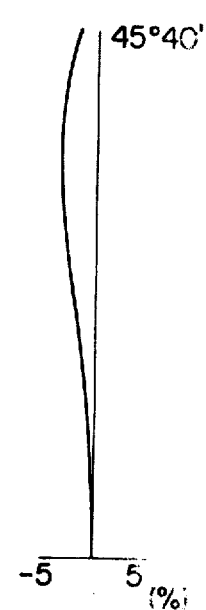
Figure 6A:
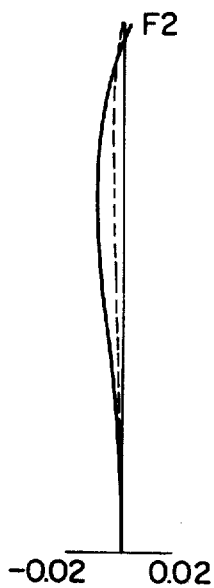
FIG. 6A through 6C are graphs illustrating the aberration characteristic curves of the embodiment 4.
Figure 6B:
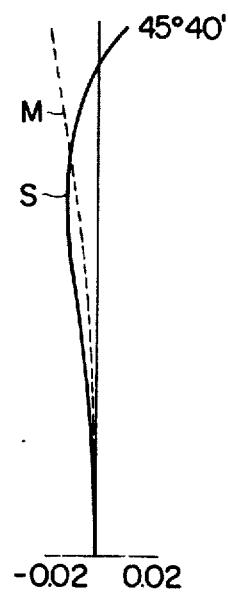
Figure 6C:
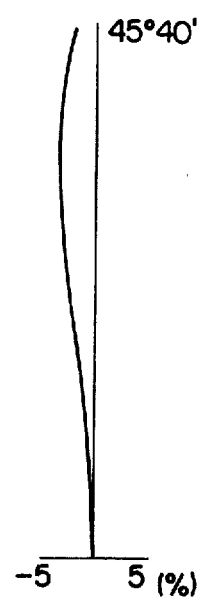

Some numerical data of the photographic lens sytem according to the present invention will be exemplified below:

Embodiment 1

| | | | |
|---|---|---|---|
| $r_1 = 2.3797$ | | | |
| | $d_1 = 0.1858$ | $n_1 = 1.72$ | $\nu_1 = 43.7$ |
| $r_2 = 6.0515$ | | | |
| | $d_2 = 0.0060$ | | |
| $r_3 = 1.0602$ | | | |
| | $d_3 = 0.0697$ | $n_2 = 1.72$ | $\nu_2 = 50.3$ |
| $r_4 = 0.5380$ | | | |
| | $d_4 = 0.2313$ | | |
| $r_5 = 2.5597$ | | | |
| | $d_5 = 0.0650$ | $n_3 = 1.757$ | $\nu_3 = 47.9$ |
| $r_6 = 0.6420$ | | | |
| | $d_6 = 0.0975$ | | |
| $r_7 = 3.7555$ | | | |
| | $d_7 = 0.4700$ | $n_4 = 1.61659$ | $\nu_4 = 36.6$ |
| $r_8 = 80.9316$ | | | |
| | $d_8 = 0.0046$ | | |
| $r_9 = 1.1565$ | | | |
| | $d_9 = 0.0650$ | $n_5 = 1.67$ | $\nu_5 = 57.3$ |
| $r_{10} = 0.6760$ | | | |
| | $d_{10} = 0.3864$ | $n_6 = 1.5934$ | $\nu_6 = 34.8$ |
| $r_{11} = -2.0937$ | | | |
| | $d_{11} = 0.1644$ | | |
| $r_{12} = -18.7474$ | | | |
| | $d_{12} = 0.1760$ | $n_7 = 1.757$ | $\nu_7 = 47.9$ |
| $r_{13} = -0.9208$ | | | |
| | $d_{13} = 0.0697$ | $n_8 = 1.80518$ | $\nu_8 = 25.4$ |
| $r_{14} = 2.0162$ | | | |
| | $d_{14} = 0.1092$ | | |
| $r_{15} = -3.0293$ | | | |
| | $d_{15} = 0.1301$ | $n_9 = 1.6968$ | $\nu_9 = 55.6$ |
| $r_{16} = -0.9252$ | | | |
| | $d_{16} = 0.0046$ | | |
| $r_{17} = 4.4424$ | | | |
| | $d_{17} = 0.1393$ | $n_{10} = 1.6968$ | $\nu_{10} = 55.6$ |
| $r_{18} = -2.2486$ | | | |

$f = 1.0$, $f_B = 1.7522$, F/2, $f_4 = 6.3724f$, $f_5 = 1.4017f$

Embodiment 2

| | | | |
|---|---|---|---|
| $r_1 = 2.2985$ | | | |
| | $d_1 = 0.1861$ | $n_1 = 1.72$ | $\nu_1 = 43.7$ |
| $r_2 = 6.1755$ | | | |
| | $d_2 = 0.0060$ | | |
| $r_3 = 1.2449$ | | | |
| | $d_3 = 0.0698$ | $n_2 = 1.72$ | $\nu_2 = 50.4$ |
| $r_4 = 0.5505$ | | | |
| | $d_4 = 0.2117$ | | |
| $r_5 = 2.7180$ | | | |
| | $d_5 = 0.0698$ | $n_3 = 1.757$ | $\nu_3 = 47.9$ |
| $r_6 = 0.6417$ | | | |
| | $d_6 = 0.0921$ | | |
| $r_7 = 3.1449$ | | | |
| | $d_7 = 0.5624$ | $n_4 = 1.61659$ | $\nu_4 = 36.6$ |
| $r_8 = -6.8093$ | | | |
| | $d_8 = 0.0047$ | | |
| $r_9 = 1.1094$ | | | |
| | $d_9 = 0.0698$ | $n_5 = 1.67$ | $\nu_5 = 57.3$ |
| $r_{10} = 0.6664$ | | | |
| | $d_{10} = 0.3582$ | $n_6 = 1.5927$ | $\nu_6 = 35.5$ |
| $r_{11} = -2.2077$ | | | |
| | $d_{11} = 0.0791$ | | |
| $r_{12} = -19.9488$ | | | |
| | $d_{12} = 0.2256$ | $n_7 = 1.762$ | $\nu_7 = 40.2$ |
| $r_{13} = -0.8204$ | | | |
| | $d_{13} = 0.0698$ | $n_8 = 1.80518$ | $\nu_8 = 25.4$ |
| $r_{14} = 1.5855$ | | | |
| | $d_{14} = 0.1037$ | | |
| $r_{15} = -4.4064$ | | | |
| | $d_{15} = 0.1303$ | $n_9 = 1.618$ | $\nu_9 = 63.4$ |
| $r_{16} = -0.9207$ | | | |
| | $d_{16} = 0.0070$ | | |
| $r_{17} = 7.4043$ | | | |
| | $d_{17} = 0.1396$ | $n_{10} = 1.6968$ | $\nu_{10} = 55.6$ |
| $r_{18} = -1.8352$ | | | |

$f = 1.0$, $f_B = 1.7442$, f/2, $f_4 = 3.5659f$, $f_5 = 1.3833f$

Embodiment 3

| | | | |
|---|---|---|---|
| $r_1 = 2.1566$ | | | |
| | $d_1 = 0.1859$ | $n_1 = 1.72$ | $\nu_1 = 43.7$ |
| $r_2 = 5.5649$ | | | |
| | $d_2 = 0.0060$ | | |
| $r_3 = 1.1925$ | | | |
| | $d_3 = 0.0697$ | $n_2 = 1.72$ | $\nu_2 = 50.3$ |
| $r_4 = 0.5291$ | | | |
| | $d_4 = 0.2310$ | | |
| $r_5 = 2.6413$ | | | |
| | $d_5 = 0.0651$ | $n_3 = 1.757$ | $\nu_3 = 47.9$ |
| $r_6 = 0.6309$ | | | |
| | $d_6 = 0.0976$ | | |
| $r_7 = 3.9450$ | | | |
| | $d_7 = 0.3837$ | $n_4 = 1.61659$ | $\nu_4 = 36.6$ |
| $r_8 = -11.2560$ | | | |
| | $d_8 = 0.0046$ | | |
| $r_9 = 1.0887$ | | | |
| | $d_9 = 0.0651$ | $n_5 = 1.67$ | $\nu_5 = 57.3$ |
| $r_{10} = 0.6404$ | | | |
| | $d_{10} = 0.4359$ | $n_6 = 1.5934$ | $\nu_6 = 34.8$ |
| $r_{11} = -1.7832$ | | | |
| | $d_{11} = 1.041$ | | |
| $r_{12} = -12.1151$ | | | |
| | $d_{12} = 0.2012$ | $n_7 = 1.757$ | $\nu_7 = 47.9$ |
| $r_{13} = -0.8601$ | | | |
| | $d_{13} = 0.0697$ | $n_8 = 1.80518$ | $\nu_8 = 25.4$ |
| $r_{14} = 1.8440$ | | | |
| | $d_{14} = 0.1204$ | | |
| $r_{15} = -3.1194$ | | | |
| | $d_{15} = 0.1301$ | $n_9 = 1.6968$ | $\nu_9 = 55.6$ |
| $r_{16} = -0.9239$ | | | |
| | $d_{16} = 0.0093$ | | |
| $r_{17} = 8.9834$ | | | |
| | $d_{17} = 0.1394$ | $n_{10} = 1.6968$ | $\nu_{10} = 55.6$ |
| $r_{18} = -1.7999$ | | | |

$f = 1.0$, $f_B = 1.7557$, F/2, $f_4 = 4.7837f$, $f_5 = 1.2852f$

Embodiment 4

| | | | |
|---|---|---|---|
| $r_1 = 2.1413$ | | | |
| | $d_1 = 0.1860$ | $n_1 = 1.72$ | $\nu_1 = 43.7$ |
| $r_2 = 5.5682$ | | | |
| | $d_2 = 0.0060$ | | |
| $r_3 = 1.2587$ | | | |
| | $d_3 = 0.0698$ | $n_2 = 1.72$ | $\nu_2 = 50.3$ |
| $r_4 = 0.5311$ | | | |
| | $d_4 = 0.2320$ | | |
| $r_5 = 2.4881$ | | | |
| | $d_5 = 0.0651$ | $n_3 = 1.757$ | $\nu_3 = 47.9$ |
| $r_6 = 0.6393$ | | | |
| | $d_6 = 0.0977$ | | |
| $r_7 = 4.2587$ | | | |
| | $d_7 = 0.3636$ | $n_4 = 1.61659$ | $\nu_4 = 36.6$ |
| $r_8 = -7.5941$ | | | |
| | $d_8 = 0.0047$ | | |
| $r_9 = 1.0986$ | | | |
| | $d_9 = 0.0651$ | $n_5 = 1.67$ | $\nu_5 = 57.3$ |
| $r_{10} = 0.6588$ | | | |
| | $d_{10} = 0.4655$ | $n_6 = 1.5927$ | $\nu_6 = 35.5$ |
| $r_{11} = -1.6073$ | | | |
| | $d_{11} = 0.1042$ | | |
| $r_{12} = -6.3013$ | | | |
| | $d_{12} = 0.1753$ | $n_7 = 1.757$ | $\nu_7 = 47.9$ |
| $r_{13} = -0.8649$ | | | |
| | $d_{13} = 0.0698$ | $n_8 = 1.80518$ | $\nu_8 = 25.4$ |
| $r_{14} = 1.8400$ | | | |
| | $d_{14} = 0.1046$ | | |
| $r_{15} = 3.0518$ | | | |
| | $d_{15} = 0.1395$ | $n_9 = 1.6968$ | $\nu_9 = 55.6$ |
| $r_{16} = 0.9570$ | | | |
| | $d_{16} = 0.0093$ | | |
| $r_{17} = 11.4357$ | | | |
| | $d_{17} = 0.1395$ | $n_{10} = 1.6968$ | $\nu_{10} = 55.6$ |
| $r_{18} = -1.5778$ | | | |

$f = 1.0$, $f_B = 1.7557$, F/2, $f_4$ 4.4776f, $f_5 = 1.2470f$ wherein reference symbols $r_1$ through $r_{18}$ represent radii of curvature of respective lens surface, $d_1$ through $d_{17}$ denote thicknesses of respective lenses and distances between respective lenses, $n_1$ through $n_{10}$ indicate refractive indices of the lenses and $\nu_1$ through $\nu_{10}$ designate Abbe's number, and reference symbol $f_B$ represents the back focal length of the lens system.

I claim:

1. A large-aperture, ultra wide angle photographic lens system comprising a first positive meniscus lens, a second negative meniscus lens, a third negative meniscus lens, a fourth positive lens, a fifth positive cemented doublet lens, a sixth negative cemented doublet lens, a seventh positive lens and an eighth positive lens, said lens system satisfying the following conditions:

$$3.4f < f_4 < 6.5f \quad (1)$$

$$1.2f < f_5 < 1.45f \quad (2)$$

$$0.35f < d_7 < 0.6f \quad (3)$$

$$0.4f < d_9 + d_{10} < 0.55f \quad (4)$$

$$0.05 < (n_7 - n_8)/r_{13} < 0.06 \quad (5)$$

wherein the reference symbols $f_4$ and $f_5$ represent respective focal lengths of the fourth lens and fifth cemented doublet lens, reference symbols $d_7$, $d_9$ and $d_{10}$ represent thicknesses of the fourth lens and respective lens elements of the fifth cemented doublet lens, reference symbols $n_7$ and $n_8$ represent refractive indices of respective lens elements of the sixth cemented doublet lens and reference symbol $r_{13}$ represent radius of curvature on the cemented surface of the sixth cemented doublet lens.

2. A large-aperture, ultra wide angle photographic lens system comprising a first positive meniscus lens, a second negative meniscus lens, a third negative meniscus lens, a fourth positive lens, a fifth positive cemented doublet lens, a sixth negative cemented doublet lens, a seventh positive lens and an eighth positive lens, said lens system having the following numerical data:

| | | | |
|---|---|---|---|
| $r_1 = 2.3797$ | | | |
| | $d_1 = 0.1858$ | $n_1 = 1.72$ | $\nu_1 = 43.7$ |
| $r_2 = 6.0515$ | | | |
| | $d_2 = 0.0060$ | | |
| $r_3 = 1.0602$ | | | |
| | $d_3 = 0.0697$ | $n_2 = 1.72$ | $\nu_2 = 50.3$ |
| $r_4 = 0.5380$ | | | |
| | $d_4 = 0.2313$ | | |
| $r_5 = 2.5597$ | | | |
| | $d_5 = 0.0650$ | $n_3 = 1.757$ | $\nu_3 = 47.9$ |
| $r_6 = 0.6420$ | | | |
| | $d_6 = 0.0975$ | | |
| $r_7 = 3.7555$ | | | |
| | $d_7 = 0.4700$ | $n_4 = 1.61659$ | $\nu_4 = 36.6$ |
| $r_8 = 80.9316$ | | | |
| | $d_8 = 0.0046$ | | |
| $r_9 = 1.1565$ | | | |
| | $d_9 = 0.0650$ | $n_5 = 1.67$ | $\nu_5 = 57.3$ |
| $r_{10} = 0.6760$ | | | |
| | $d_{10} = 0.3864$ | $n_6 = 1.5934$ | $\nu_6 = 34.8$ |
| $r_{11} = -2.0937$ | | | |
| | $d_{11} = 0.1644$ | | |
| $r_{12} = -18.7474$ | | | |
| | $d_{12} = 0.1760$ | $n_7 = 1.757$ | $\nu_7 = 47.9$ |
| $r_{13} = -0.9208$ | | | |
| | $d_{13} = 0.0697$ | $n_8 = 1.80518$ | $\nu_8 = 25.4$ |
| $r_{14} = 2.0162$ | | | |
| | $d_{14} = 0.1092$ | | |
| $r_{15} = -3.0293$ | | | |
| | $d_{15} = 0.1301$ | $n_9 = 1.6968$ | $\nu_9 = 55.6$ |
| $r_{16} = -0.9252$ | | | |
| | $d_{16} = 0.0046$ | | |
| $r_{17} = 4.4424$ | | | |
| | $d_{17} = 0.1393$ | $n_{10} = 1.6968$ | $\nu_{10} = 55.6$ |
| $r_{18} = -2.2486$ | | | |

$f = 1.0$, $f_B = 1.7522$, wherein reference symbols $r_1$ through $r_{18}$ represent radii of curvature or respective lens surfaces, $d_1$ through $d_{17}$ denote thicknesses of respective lenses and distances between respective lenses, $n_1$ through $n_{10}$ indicate refractive indices of the lenses and $\nu_1$ through $\nu_{10}$ designate Abbe's number.

3. A large-aperture, ultra wide angle photographic lens system comprising a first positive meniscus lens, a second negative meniscus lens, a third negative meniscus lens, a fourth positive lens, a fifth positive cemented doublet lens, a sixth negative cemented doublet lens, a seventh positive lens and an eighth positive lens, said lens system having the following numerical data:

| | | | |
|---|---|---|---|
| $r_1 = 2.2985$ | | | |
| | $d_1 = 0.1861$ | $n_1 = 1.72$ | $\nu_1 = 43.7$ |
| $r_2 = 6.1755$ | | | |
| | $d_2 = 0.0060$ | | |
| $r_3 = 1.2449$ | | | |
| | $d_3 = 0.0698$ | $n_2 = 1.72$ | $\nu_2 = 50.4$ |
| $r_4 = 0.5505$ | | | |
| | $d_4 = 0.2117$ | | |
| $r_5 = 2.7180$ | | | |
| | $d_5 = 0.0698$ | $n_3 = 1.757$ | $\nu_3 = 47.9$ |
| $r_6 = 0.6417$ | | | |
| | $d_6 = 0.0921$ | | |
| $r_7 = 3.1449$ | | | |
| | $d_7 = 0.5624$ | $n_4 = 1.61659$ | $\nu_4 = 36.6$ |
| $r_8 = -6.8093$ | | | |
| | $d_8 = 0.0047$ | | |
| $r_9 = 1.1094$ | | | |
| | $d_9 = 0.0698$ | $n_5 = 1.67$ | $\nu_5 = 57.3$ |
| $r_{10} = 0.6664$ | | | |
| | $d_{10} = 0.3582$ | $n_6 = 1.5927$ | $\nu_6 = 35.5$ |
| $r_{11} = -2.2077$ | | | |
| | $d_{11} = 0.0791$ | | |
| $r_{12} = -19.9488$ | | | |
| | $d_{12} = 0.2256$ | $n_7 = 1.762$ | $\nu_7 = 40.2$ |
| $r_{13} = -0.8204$ | | | |
| | $d_{13} = 0.0698$ | $n_8 = 1.80518$ | $\nu_8 = 25.4$ |
| $r_{14} = 1.5855$ | | | |
| | $d_{14} = 0.1037$ | | |
| $r_{15} = -4.4064$ | | | |
| | $d_{15} = 0.1303$ | $n_9 = 1.618$ | $\nu_9 = 63.4$ |
| $r_{16} = -0.9207$ | | | |
| | $d_{16} = 0.0070$ | | |
| $r_{17} = 7.4043$ | | | |
| | $d_{17} = 0.1396$ | $n_{10} = 1.6968$ | $\nu_{10} = 55.6$ |
| $r_{18} = -1.8352$ | | | |

$f = 1.0$, $f_B = 1.7442$, F/2 wherein the reference symbols $r_1$ through $r_{18}$ represent radii of curvature of respective lens surfaces, $d_1$ through $d_{17}$ denote thicknesses of respective lenses and distances between respective lenses, $n_1$ through $n_{10}$ indicate refractive indices of the lenses and $\nu_1$ through $\nu_{10}$ designate Abbe's number.

4. A large-aperture, ultra wide angle photographic lens system comprising a first positive meniscus lens, a second negative meniscus lens, a third negative meniscus lens, a fourth positive lens, a fifth positive cemented doublet lens, a sixth negative cemented doublet lens, a seventh positive lens and an eighth positive lens, said lens system having the following numerical data:

| | | | |
|---|---|---|---|
| $r_1 = 2.1566$ | | | |
| | $d_1 = 0.1859$ | $n_1 = 1.72$ | $\nu_1 = 43.7$ |
| $r_2 = 5.5649$ | | | |
| | $d_2 = 0.0060$ | | |
| $r_3 = 1.1925$ | | | |
| | $d_3 = 0.0697$ | $n_2 = 1.72$ | $\nu_2 = 50.3$ |
| $r_4 = 0.5291$ | | | |
| | $d_4 = 0.2310$ | | |
| $r_5 = 2.6413$ | | | |
| | $d_5 = 0.0651$ | $n_3 = 1.757$ | $\nu_3 = 47.9$ |
| $r_6 = 0.6309$ | | | |
| | $d_6 = 0.0976$ | | |
| $r_7 = 3.9450$ | | | |
| | $d_7 = 0.3837$ | $n_4 = 1.61659$ | $\nu_4 = 36.6$ |
| $r_8 = -11.2560$ | | | |
| | $d_8 = 0.0046$ | | |
| $r_9 = 1.0887$ | | | |
| | $d_9 = 0.0651$ | $n_5 = 1.67$ | $\nu_5 = 57.3$ |
| $r_{10} = 0.6404$ | | | |
| | $d_{10} = 0.4359$ | $n_6 = 1.5934$ | $\nu_6 = 34.8$ |
| $r_{11} = -1.7832$ | | | |
| | $d_{11} = 1.041$ | | |
| $r_{12} = -12.1151$ | | | |
| | $d_{12} = 0.2012$ | $n_7 = 1.757$ | $\nu_7 = 47.9$ |
| $r_{13} = -0.8601$ | | | |
| | $d_{13} = 0.0697$ | $n_8 = 1.80518$ | $\nu_8 = 25.4$ |

-continued $r_{14} = 1.8440$
$d_{14} = 0.1204$
$r_{15} = -3.1194$
$d_{15} = 0.1301$ $n_9 = 1.6968$ $\nu_9 = 55.6$
$r_{16} = -0.9239$
$d_{16} = 0.0093$
$r_{17} = 8.9834$
$d_{17} = 0.1394$ $n_{10} = 1.6968$ $\nu_{10} = 55.6$
$r_{18} = -1.7999$
$f = 1.0$, $f_B = 1.7557$, F/2 wherein reference symbols $r_1$ through $r_{18}$ represent radii of curvature of respective lens surfaces, $d_1$ through $d_{17}$ denote thicknesses of respective lenses and distances between respective lenses, $n_1$ through $n_{10}$ indicate refractive indices of the lenses and $\nu_1$ through $\nu_{10}$ designate Abbe's number.

5. A large-aperture, ultra wide angle photographic lens system comprising a first positive meniscus lens, a second negative meniscus lens, a third negative meniscus lens, a fourth positive lens, a fifth lens, a seventh positive lens and an eighth positive lens, said lens system having the following numerical data:

$r_1 = 2.1413$
$d_1 = 0.1860$ $n_1 = 1.72$ $\nu_1 = 43.7$
$r_2 = 5.5682$
$d_2 = 0.0060$
$r_3 = 1.2587$
$d_3 = 0.0698$ $n_2 = 1.72$ $\nu_2 = 50.3$
$r_4 = 0.5311$
$d_4 = 0.2320$ $r_5 = 2.4881$
$d_5 = 0.0651$ $n_3 = 1.757$ $\nu_3 = 47.9$
$r_6 = 0.6393$
$d_6 = 0.0977$
$r_7 = 4.2587$
$d_7 = 0.3636$ $n_4 = 1.61659$ $\nu_4 = 36.6$
$r_8 = -7.5941$
$d_8 = 0.0047$
$r_9 = 1.0986$
$d_9 = 0.0651$ $n_5 = 1.67$ $\nu_5 = 57.3$
$r_{10} = 0.6588$
$d_{10} = 0.4655$ $n_6 = 1.5927$ $\nu_6 = 35.5$
$r_{11} = -1.6073$
$d_{11} = 0.1042$
$r_{12} = -6.3013$
$d_{12} = 0.1753$ $n_7 = 1.757$ $\nu_7 = 47.9$
$r_{13} = -0.8649$
$d_{13} = 0.0698$ $n_8 = 1.80518$ $\nu_8 = 25.4$
$r_{14} = 1.8400$
$d_{14} = 0.1046$
$r_{15} = -3.0518$
$d_{15} = 0.1395$ $n_9 = 1.6968$ $\nu_9 = 55.6$
$r_{16} = -0.9570$
$d_{16} = 0.0093$
$r_{17} = 11.4357$
$d_{17} = 0.1395$ $n_{10} = 1.6968$ $\nu_{10} = 55.6$
$r_{18} = -1.5778$
$f = 1.0$, $f_B = 1.7557$, F/2 wherein reference symbols $r_1$ through $r_{18}$ represent radii of curvature of respective lens surfaces, $d_1$ through $d_{17}$ denote thicknesses of respective lenses and distances between respective lenses, $n_1$ through $n_{10}$ indicate refractive indices of the lenses and $\nu_1$ through $\nu_{10}$ designate Abbe's number.

* * * * *